(12) United States Patent
Worrall et al.

(10) Patent No.: US 10,506,488 B2
(45) Date of Patent: Dec. 10, 2019

(54) SETUP OR MODIFICATION OF DATA FLOWS BETWEEN USER EQUIPMENT IN DUAL CONNECTIVITY

(71) Applicant: Alcatel Lucent, Boulogne Billancourt (FR)

(72) Inventors: Chandrika K. Worrall, Newbury (GB); Sudeep K. Palat, Swindon (GB)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 14/911,050

(22) PCT Filed: Jul. 21, 2014

(86) PCT No.: PCT/EP2014/001998
§ 371 (c)(1),
(2) Date: Feb. 9, 2016

(87) PCT Pub. No.: WO2015/018496
PCT Pub. Date: Feb. 12, 2015

(65) Prior Publication Data
US 2016/0183148 A1    Jun. 23, 2016

(30) Foreign Application Priority Data

Aug. 9, 2013 (EP) .................................... 13360021

(51) Int. Cl.
*H04W 36/22* (2009.01)
*H04W 76/15* (2018.01)
*H04W 84/04* (2009.01)
(52) U.S. Cl.
CPC ........... *H04W 36/22* (2013.01); *H04W 76/15* (2018.02); *H04W 84/045* (2013.01); *Y02D 70/00* (2018.01)

(58) Field of Classification Search
CPC ... H04W 36/22; H04W 76/15; H04W 76/025; Y02D 70/23; Y02D 70/00; Y02B 60/50
See application file for complete search history.

(56) References Cited

U.S. PATENT DOCUMENTS 8,566,455 B1 * 10/2013 Zhao .................. H04W 76/025
709/227
2010/0322180 A1   12/2010 Kim
(Continued)

FOREIGN PATENT DOCUMENTS

CN     103026752     4/2013
JP     2013-115502 A  6/2013
(Continued)

OTHER PUBLICATIONS

3GPP TS 36.300 V11.5.0, Mar. 2013, p. 32-38, URL:http:// www.3gpp.org/ftp/Specs/archive/36_series/36.300/36300-b50.zip.
(Continued)

*Primary Examiner* — Steven H Nguyen
(74) *Attorney, Agent, or Firm* — Fay Sharpe LLP

(57) ABSTRACT

A method, in a radio communication system, for setup or modification of data flows between user equipment in dual connectivity with a primary node and a secondary node of the system, comprising 1 receiving a bearer request for a data flow from a mobility management entity of the system; determining, at a core network or radio access network node of the system or at a network management node for the system located outside of the core network, if the data flow is to be transmitted to the user equipment (UE) via the primary or secondary nodes; selecting the primary or secondary node for transmitting the data flow to the user equipment; and transmitting the data flow to the user equipment via the selected node.

17 Claims, 7 Drawing Sheets

(56) References Cited

U.S. PATENT DOCUMENTS

| | | | | |
|---|---|---|---|---|
| 2013/0176988 | A1* | 7/2013 | Wang | H04W 28/08 370/331 |
| 2013/0322235 | A1* | 12/2013 | Khoryaev | H04W 24/10 370/229 |
| 2014/0010207 | A1* | 1/2014 | Horn | H04W 36/165 370/332 |
| 2014/0082697 | A1* | 3/2014 | Watfa | H04W 76/025 726/3 |
| 2014/0204771 | A1* | 7/2014 | Gao | H04W 36/28 370/252 |
| 2014/0269632 | A1* | 9/2014 | Blankenship | H04W 76/025 370/336 |
| 2014/0301360 | A1* | 10/2014 | Bontu | H04W 36/0083 370/331 |
| 2014/0307622 | A1* | 10/2014 | Horn | H04L 45/245 370/328 |
| 2015/0045038 | A1* | 2/2015 | Gao | H04W 36/22 455/438 |
| 2016/0073247 | A1* | 3/2016 | Liu | H04L 12/1403 455/406 |

FOREIGN PATENT DOCUMENTS

| | | |
|---|---|---|
| JP | 2014-522602 A | 9/2014 |
| WO | 2012/166975 A | 12/2012 |
| WO | 2013/010418 A | 1/2013 |
| WO | 2014/113236 | 7/2014 |

OTHER PUBLICATIONS

Intel Corporation, "S1 versus X2 Approach for Dual Connectivity," $3^{rd}$ Generation Partnership Project (3GPP), 3GPP TSG RAN WG2 Meeting #81bis, R2-131403, 10 pages, XP050699524, Chicago, USA, Apr. 15-19, 2013.

Intel Corporation, "Radio link failure handling for dual connectivity," $3^{rd}$ Generation Partnership Project (3GPP), 3GPP TSG RAN WG2 Meeting #82, R2-131990, 4 pages, XP050700115, Fukuoka, Japan, May 20-25, 2013.

Catt, "RRM related issues of Dual Connectivity technique," $3^{rd}$ Generation Partnership Project (3GPP), 3GPP TSG RAN WG2 Meeting #81bis, R2-130978, 4 pages, XP050699191, Apr. 15-19, 2013.

ETRI, "Considerations on Network Architecture for Dual Connectivity," $3^{rd}$ Generation Partnership Project (3GPP), 3GPP TSG-RAN WG2 #81bis, R2-131185, 4 pages, XP050699274, Chicago, USA, Apr. 15-19, 2013.

International Search Report for PCT/EP2014/001998 dated Aug. 26, 2014.

Sharp, Signalling load for the mobility on Small cell deployments [online], 3GPP TSG-RAN WG2#82 R2-131870, May 24, 2013, Internet<URL:http://www.3gpp.org/ftp/tsg_ran/WG2_RL2/TSGR2_82/Docs/R2-131870.zip>.

Catt, Discussion on Xn interface between MeNB and SeNB[online], 3GPP TSG-RAN WG3#81 R3-131221, Aug. 9, 2013, Internet<URL:http://www.3gpp.org/ftp/tsg_ran/WG3_Iu/TSGR3_81/Docs/R3-131221.zip>.

NEC Corporation, Small Cell enhancement EUTRAN interfaces[online], 3GPP TSG-RAN WG2#83 R2-132677, Aug. 9, 2013, Internet<URL:http://www.3gpp.org/ftp/tsg_ran/WG2_RL2/TSGR2_83/Docs/R2-132677.zip>.

* cited by examiner

SETUP OR MODIFICATION OF DATA FLOWS BETWEEN USER EQUIPMENT IN DUAL CONNECTIVITY

TECHNICAL FIELD

The present invention relates to a method, in a radio communication system comprising a user equipment in dual connection with a primary node and a secondary node, a telecommunications system, a primary node, a secondary node and to a user equipment.

BACKGROUND

Small Cells are low power, low-cost base stations that are able to provide cellular service in residential or enterprise environments, with a typical coverage range of tens of metres. They have auto-configuration and self-optimization capabilities that enable a simple plug and play deployment, and are designed to automatically integrate themselves into an existing macrocellular network. Small cells, often referred to as pico cells, or metro cells, typically use a customer's broadband internet connection, for example DSL, cable or the like, as backhaul towards the macrocellular network. Support of non-ideal backhaul (with one way latency of few milliseconds to few tens of milliseconds) between small cells and between small cell and macro cells is considered as the typical deployment scenario.

Small cell deployment for handling capacity needs in high traffic areas, such as hot spot areas, is an area of investigation. A proposal for handling capacity needs in high traffic areas is to provide dual connectivity support for user equipment. Dual connectivity support allows a User Equipment (UE) to be concurrently connected to a macro cell and a small cell, or to two small cells for example. A UE can thus be connected to and served by more than one cell at a time. Dual connectivity support is considered as a way to enable offloading of traffic when required.

SUMMARY

According to an example, there is provided a method, in a radio communication system, for setup or modification of data flows between user equipment in dual connectivity with a primary node and a secondary node of the system, comprising receiving a bearer request for a data flow from a mobility management entity of the system; determining, at a core network or radio access network node of the system or at a network management node for the system located outside of the core network, if the data flow is to be transmitted to the user equipment (UE) via the primary or secondary nodes, selecting the primary or secondary node for transmitting the data flow to the user equipment, and transmitting the data flow to the user equipment via the selected node. The method can further include the step of determining if the data flow is to be transmitted to the user equipment (UE) via the primary or secondary nodes is performed by a mobility management entity, serving gateway or PDN gateway of the core network. The radio access network node can be the primary node. There need be no direct link between the mobility management entity and the secondary node. Setup and/or modification data can be delivered using the primary node. Determining can include determining a radio condition between UE and the primary node and a radio condition between UE and the secondary node.

According to an example, there is provided a radio telecommunication system comprising a primary node, a secondary node, a UE in dual connectivity with the primary node and a secondary node of the system, the system operable to receive a bearer request for a data flow from a mobility management entity of the system, determine, at a core network or radio access network node of the system or at a network management node for the system located outside of the core network, if the data flow is to be transmitted to the user equipment (UE) via the primary or secondary nodes, selecting the primary or secondary node for transmitting the data flow to the user equipment, and transmitting the data flow to the user equipment via the selected node.

The system can be operable to determine on the basis of data representing quality of service parameters for the system. There need be no direct link between the mobility management entity and the secondary node of the system. Setup and/or modification data can be delivered using the primary node of the system. The system can be operable to determine a radio condition between UE and the primary node and a radio condition between UE and the secondary node.

According to an example, there is provided a primary node of a radio telecommunication system as provided above, operable in a dual connectivity link with a UE. According to an example, there is provided a secondary node of a radio telecommunication system as provided above, operable in a dual connectivity link with a UE. According to an example, there is provided a UE in dual connectivity with a primary node and a secondary node of a system as provided above.

According to an example, there is provided a UE in dual connectivity with a primary node and a secondary node of a system, the UE operable in accordance with a method as provided above.

According to an example, there is provided a node of a radio telecommunication system operable to determine if a data flow is to be transmitted to user equipment via a primary or secondary node of the system in response to a bearer request for the data flow from a mobility management entity of the system.

BRIEF DESCRIPTION OF THE DRAWINGS

Embodiments will now be described, by way of example only, with reference to the accompanying drawings, in which.

DETAILED DESCRIPTION

Figure 1:
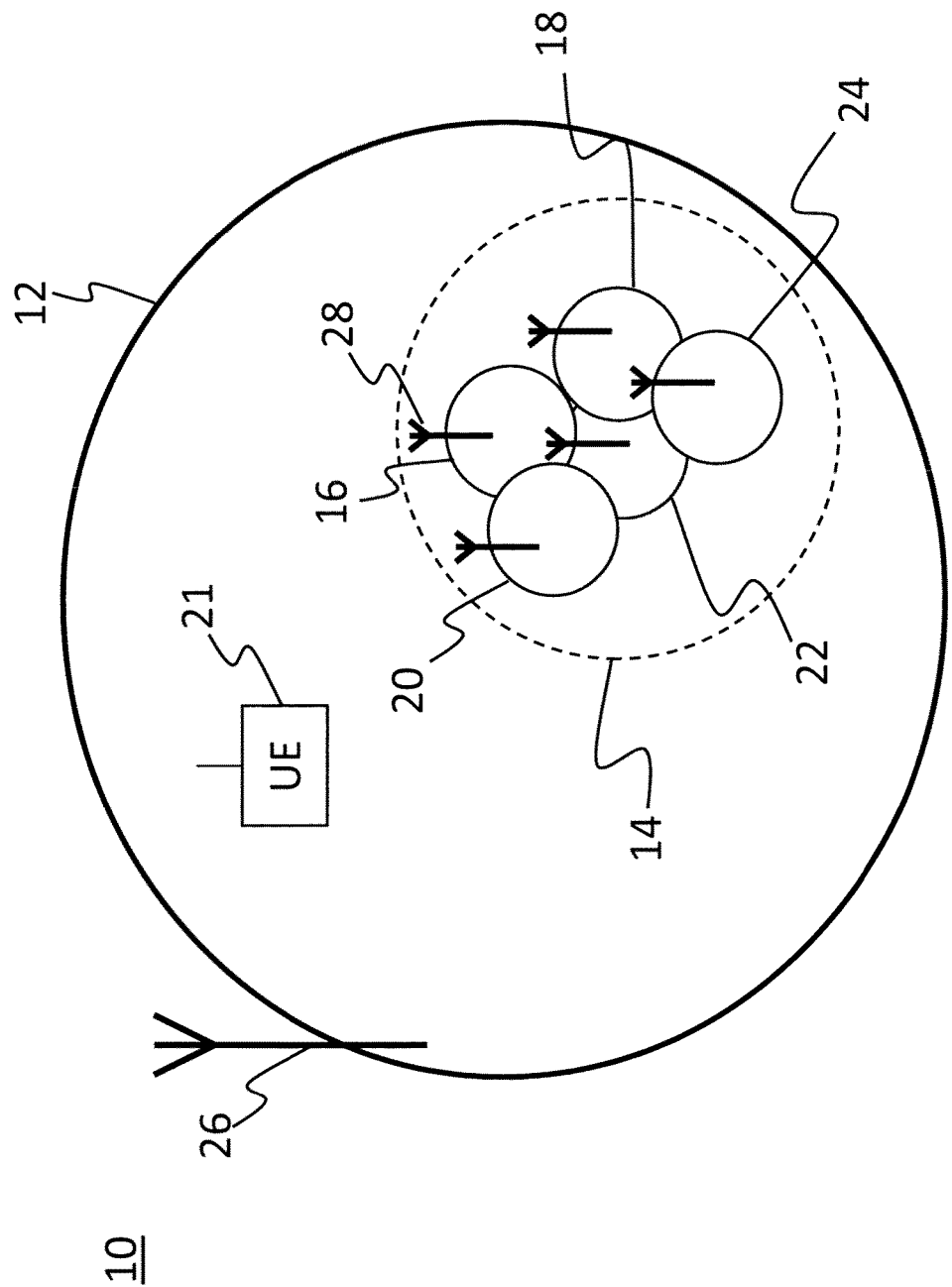
FIG. 1 is a schematic representation of a heterogeneous telecommunications network comprising a macro cell and a cluster of small cells.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

FIG. 1 is a schematic representation of a heterogeneous telecommunications system 10 comprising a macro cell 12 and a cluster of small cells 14. The cell 12 and respective ones of the cells in the cluster of small cells 14 are served by E-UTRAN Node Bs, also known as Evolved Node Bs (herein "eNB", also interchangeably referred to as "nodes") which form the hardware that is connected to the radio communication network that communicates directly with mobile handsets, known as user equipment (UE).

The cluster of small cells 14 comprises a first small cell 16, a second small cell 18, a third small cell 20, a fourth small cell 22 and a fifth small cell 24. The small cells are distributed geographically to provide an area of coverage within the macro cell 12. UE 21 may roam through the network 10. When the user equipment is located within the macro cell 12, communications may be established between the user equipment and the macro cell base station 26 over an associated radio link. If the user equipment is located geographically within one of the small cells 16, 18, 20, 22 and 24, communications may be established between the user equipment and the base station of the associated small cell over an associated radio link. It will be appreciated that FIG. 1 shows only an example heterogeneous network and that a plurality of macro cells may be provided, more or less than five small cells may be provided and a plurality of small cell clusters may be provided.

As described above, within the macro cell 12, there is provided multiple small cell base stations which provide a plurality of small cells 16, 18, 20, 22, and 24. The small cells provide local communications coverage for a user in their vicinity. As a user equipment comes within range of a small cell, such as the first small cell 16, a handover may occur between the base station 26 of the macro cell and the base station 28 of the small cell, such as when the base station of the small cell detects that user equipment has come within range. Likewise, as a user equipment comes within range of a different small cell, a handover may occur between the base station of the current small cell and the base station of the new small cell when the base station of the new small cell detects that user equipment has come within range.

In order to handle the capacity needs of a high traffic area, a user equipment in the telecommunications network 10 of FIG. 1 may be provided with dual connectivity support. That is, a user equipment may be connected to both the macro cell 12 and the small cell 16. Also, it should be appreciated that a user equipment may be dual connected to small cell 16 and any of the other small cells 18 to 24.

Dual connectivity as described with reference to FIG. 1 can be used to enable offloading of traffic via small cell when required. For example, a data flow associated with a specific service in use by the user equipment can be offloaded to a small cell in high traffic areas that may otherwise cause the macro cell 12 to become overloaded for example.

Thus, UE 21 can be connected to more than one cell at a time and the UE can therefore be served by more than one cell, which can belong to different eNBs from different vendors. A small cell need not only serve offloaded traffic for dual connected UEs but can also serve legacy UEs that are directly connected to the small cell. Typically, a UE connected to the network is identified using an identifier such as an allocated Cell Radio Network Temporary Identifier, or C-RNTI, which is allocated to the UE at its initial access to the network, and which can be changed using hand over procedures.

According to an example, a process for setup and modification when offloading traffic bearers is provided. There is no direct connection between the MME and the small cell even though the S1-U interface is between the S-GW and the small cell. Thus the necessary bearer setup/modification information is delivered via the macro cell eNB.

Figure 2:
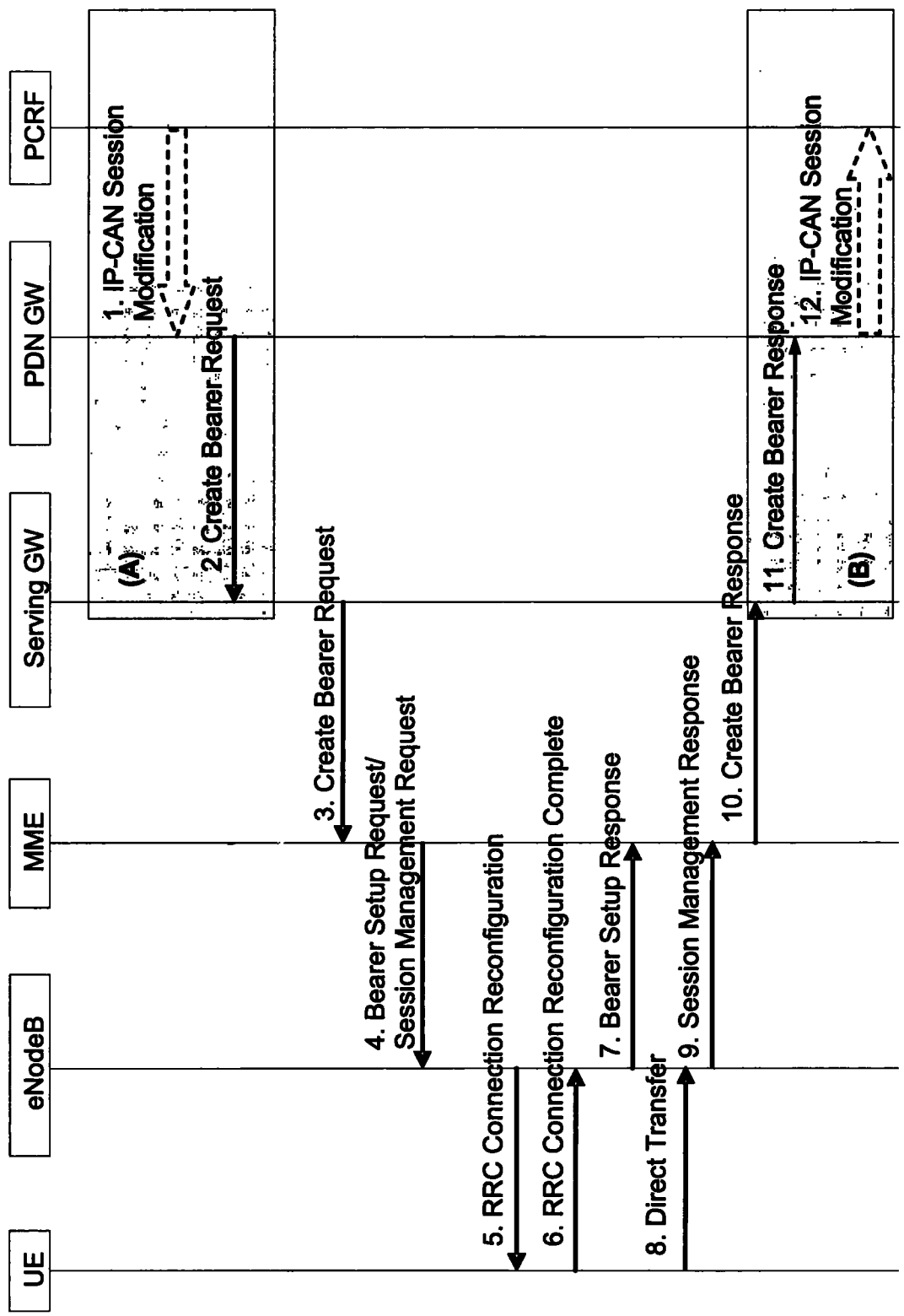
FIG. 2 is a schematic representation of a bearer setup process according to an example.

FIG. 2 is a schematic representation of a bearer setup process for dedicated bearer establishment in a legacy system according to an example. Dedicated bearer establishment may be initiated by the PCRF based on the arrival of data from an application with different QoS requirements that requires a new bearer establishment.

The PDN GW uses the QoS information provided by the PCRF policy to assign the EPS bearer QoS (ie: QCI, ARP, GBR and MBR) PDN GW generates a charging ID for the dedicated bearer. The PDN GW sends a create bearer request message to the serving GW. The message includes IMSI, EPS bearer QoS, S5/S8 TEID, charging Id, the linked EPS bearer identity (which is the EPS bearer identity of the default bearer). The serving GW sends the create bearer request message (including IMSI, PTI, EPS bearer QoS, TFT, S PDN GW TEID, LBI) to the MME.

The MME selects an EPS bearer identity which has not yet been assigned to the UE. The MME then builds a session management request including the PTI, TFT, EPS bearer QoS parameters (excluding ARP), the EPS bearer identity and the LBI. The MME then signals the bearer setup request (EPS bearer identity, EPS bearer QoS, session management request, S1-TEID) message to the eNB.

The eNB maps the EPS bearer QoS to the radio bearer QoS and signals the radio bearer configuration to the UE in RRC connection reconfiguration message. The UE NAS stores the EPS bearer identity and links the dedicated bearer to the default bearer indicated by the LBI. The UE uses the uplink packet filter (UL TFT) to determine the mapping of traffic flows to the radio bearer. The UE acknowledges the bearer activation to the the eNB with a RRC connection reconfiguration complete message. The eNB acknowledges the bearer activation to the MME with a bearer setup response message (EPS bearer identity, S1-TEID). Upon reception of the bearer setup response and session management response messages, the MME acknowledges the bearer activation to the serving GW by sending a create bearer response message (EPS bearer identity, S1-TEID, user location info, ECGI). The serving GW acknowledges the bearer activation to the PDN GW.

Figure 3:
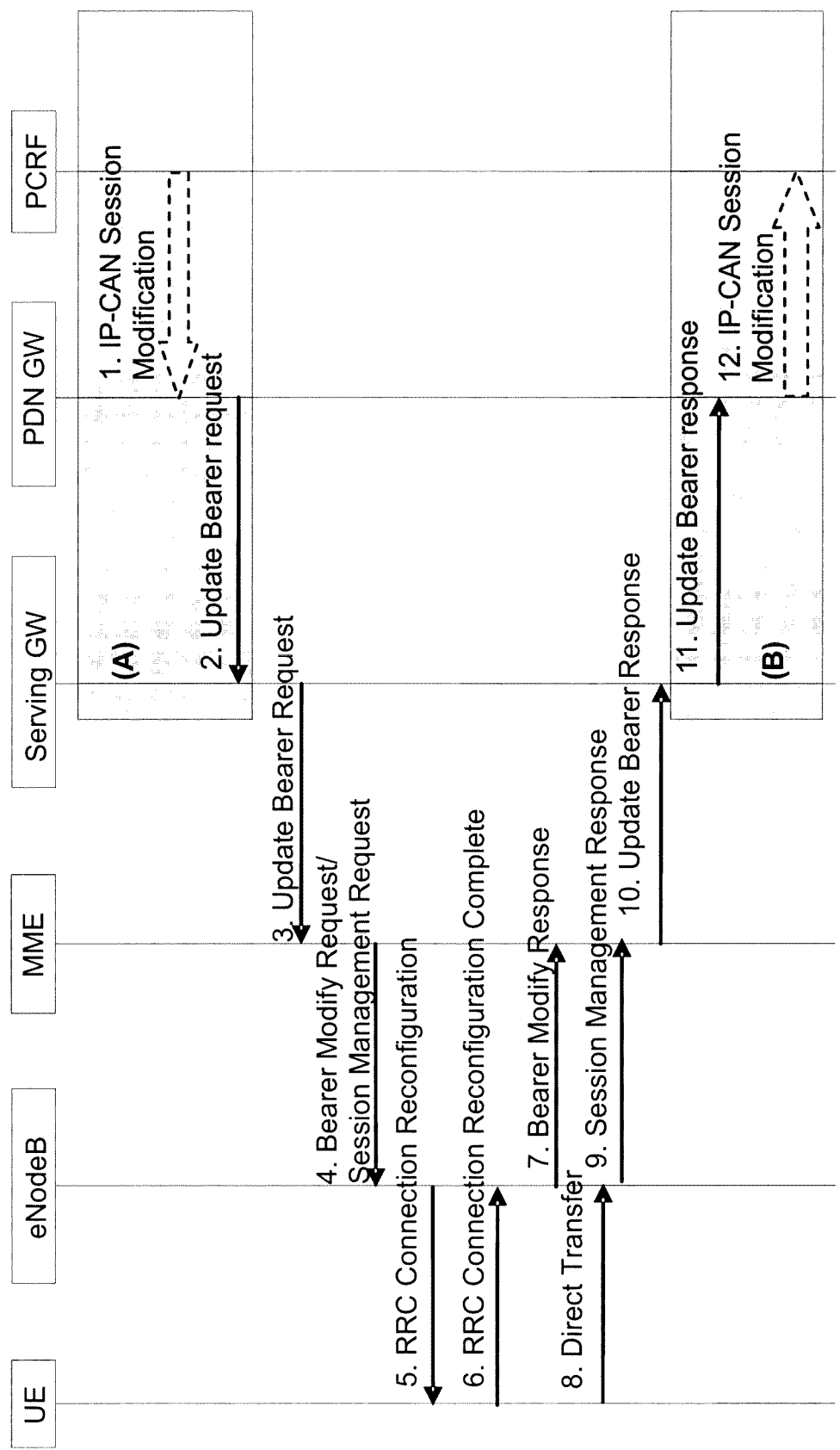
FIG. 3 is a schematic representation of a bearer modification process according to an example.

FIG. 3 is a schematic representation of a bearer modification process according to an example.

The legacy procedure is modified to take into account the following points:

1). The dedicated bearers are established between the small cell and the S-GW;
2). The bearers for the for the same PDN connection are terminated in different nodes. A bearer is connected between the macro eNB and S-GW while other bearers are connected between the small cell eNB and S-GW;
3). The terminating point for the control signaling is different from the terminating point of the EPS bearer; and
4) Small eNB and macro eNB may be with different PLMNs and UE may have different access restrictions In one embodiment of the invention, the eNB takes a decision at the time of bearer establishment to directly establish the bearer in the small cell.

Figure 4A:
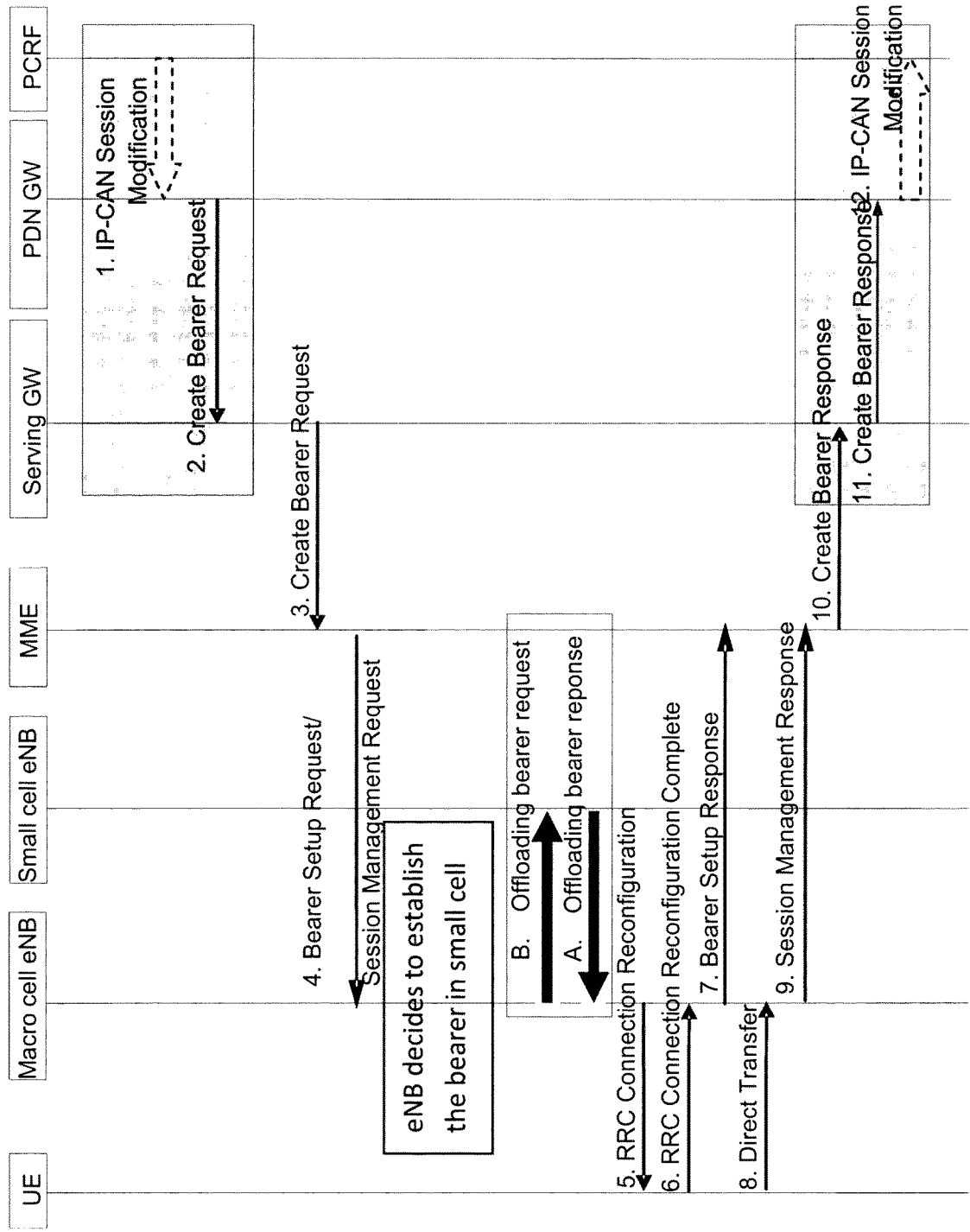
FIG. 4a is a schematic representation of a process for establishing a bearer in a small cell according to an example.

FIG. 4a is a schematic representation of a process for establishing a bearer in a small cell according to an example. Two new messages are introduced for the bearer information communication between the macro cell eNB and the small cell eNB (marked as message A and B in FIG. 4a)

Figure 4B:
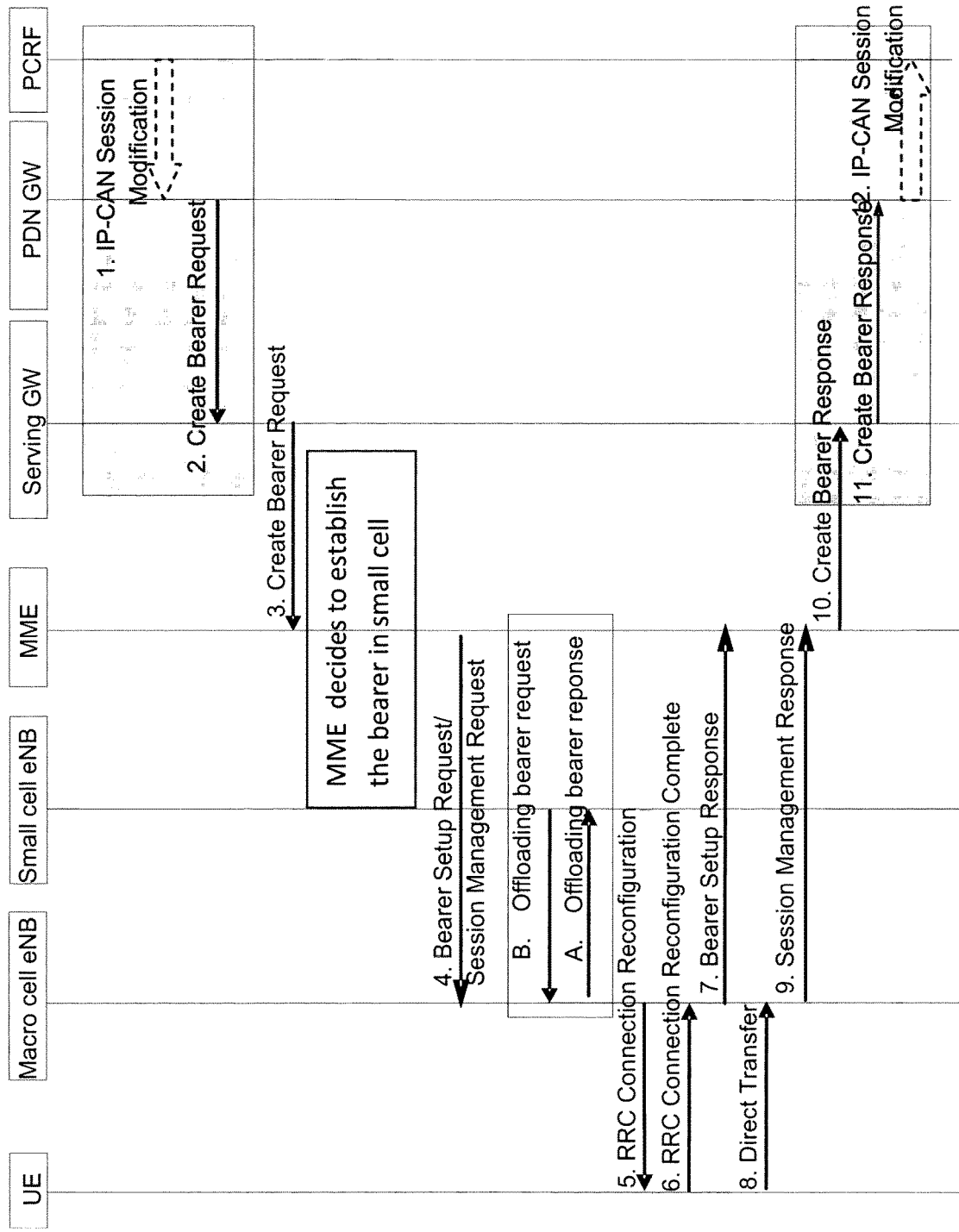
FIG. 4b is a schematic representation of a process for establishing a bearer in a small cell according to an example.

In another embodiment, the CN (MME, S-GW or P-GW) makes a decision to request or suggest to establish the bearer in the small cell. The message flows where the MME takes the decision is shown in FIG. 4b. Message 1 includes similar information as the legacy IP-CAN session modification message. If the decision for the traffic offloading via the small cell is taken by a external node, the bearer terminating information (i.e. the bearer is provided over the small cell can be included as a new parameter in the IP-CAN session modification message.

The PDN GW generates a charging ID. If the operator wants to charge the offloaded traffic differently from the other traffic, a different charging ID could be allocated for the EPS bearer If the PDN GW is aware of the offloading traffic decision. The serving GW sends the create bearer request message to the MME. However, as the serving GW does not have a downlink S1-U for the UE in the small cell, the message also indicates the need for S1-U establishment for the UE in the small cell. This is possible if the serving GW is aware of the established bearer is offloading bearer.

The MME selects an EPS Bearer Identity, which has not yet been assigned to the UE. The MME then builds a Session Management Request including the PTI, TFT, EPS Bearer QoS parameters (excluding ARP), Protocol Configuration Options, the EPS Bearer Identity, the Linked EPS Bearer Identity (LBI) and indication of traffic offloading via small cell and small cell ID.

If the traffic offloading decision is made by the MME, the MME has the information of which small cell is used for the traffic offloading. Otherwise, if the traffic offloading decision is made by Serving GW, PDN-GW or outside node, the information of small cell ID for corresponding bearers are provided to the MME with the create bearer request. In either case, the MME has the information regarding the small cell ID for the offloaded traffic. The MME then signals the bearer setup request (EPS bearer identity, EPS bearer QoS, session management request, S1-TEID intended for the small cell eNB message to the macro eNB.

Based on the received information, the macro eNB generates traffic offloading request message for the corresponding bearers. The message includes EPS bearer identity, EPS bearer QoS, and S1-TEID intended for the small cell eNB. The small cell eNB configures the radio resources for the requested EPS bearer and also established a S1-U connection towards the Serving GW. The small cell acknowledges the bearer setup to the macro cell eNB and provides the bearer configuration information to be sent to the UE.

The macro cell eNB sends the RRC connection reconfiguration to the UE, the message informs the UE of the bearer establishment over the small cell. The UE sets up the corresponding bearers and acknowledges the process by sending RRC connection re-establishment and direct transfer messages to the macro eNB.

In another embodiment, this bearer may be the first bearer in the small cell for this UE. In this case, at the time of bearer establishment, the procedures used for mobility to the small cell is used possibly including RACH access for UL synchronisation.

Figure 5:
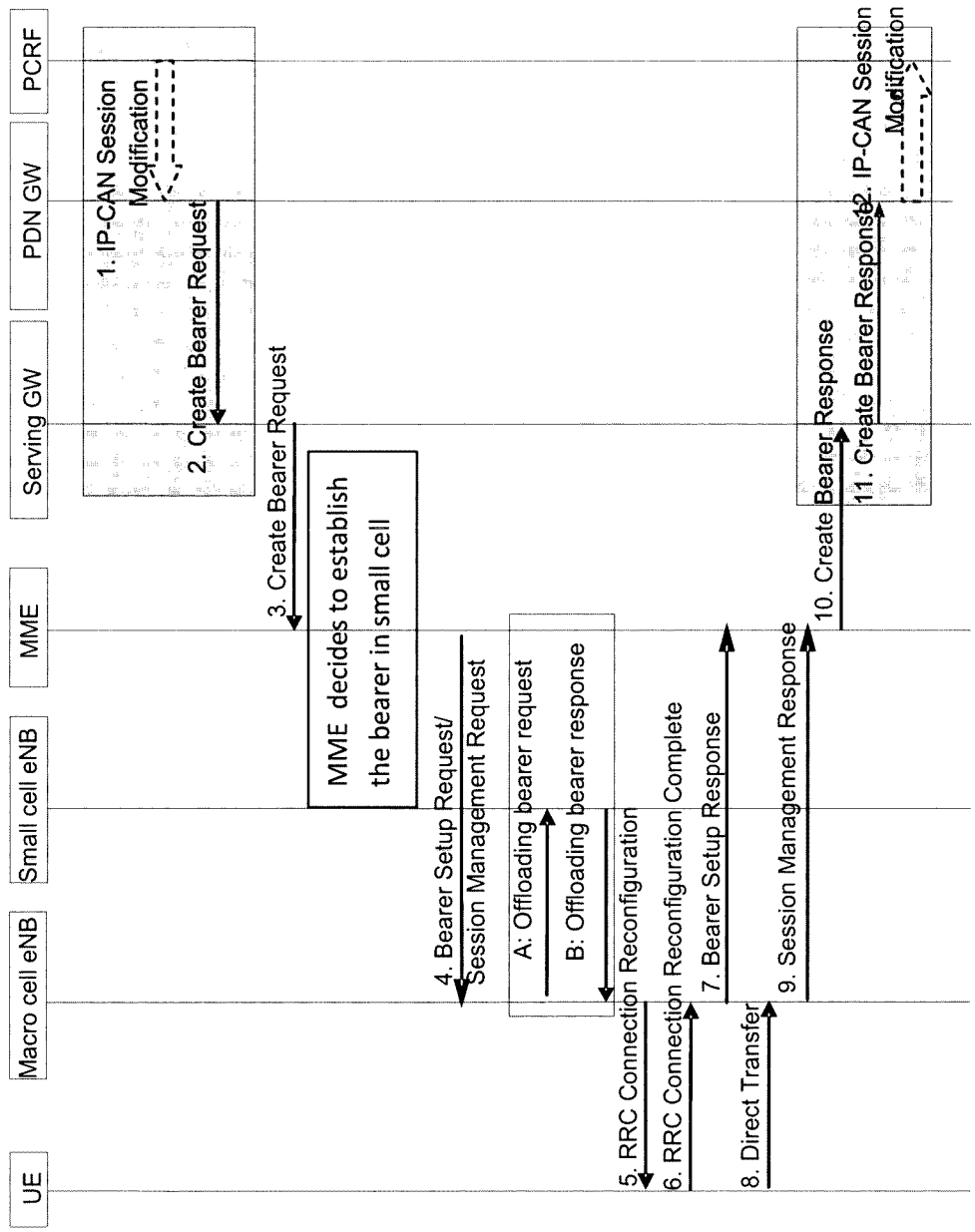
FIG. 5 is a schematic representation of a bearer modification process according to an example.

The bearer modification procedure shown in FIG. 5 has similar message structure and signaling flows to that of bearer setup procedure describe with reference to FIG. 4a/b.

In order for the core network (eg: MME) to make the decision on traffic offloading via small cell, the MME should have information that the UE is within the area of macro eNB and the small cell eNB, ie: the radio condition between the UE and the macro eNB and the UE and the small cell eNB should be good for the over radio configuration. In one embodiment, the information can be provided to the MME from the macro cell eNB using a new message. In another embodiment, the MME is aware of this from existing bearers in the small cells for the UE. Additionally the load information of the macro eNB and the small cell may be provided to the UE. The traffic offloading decision can be taken based on pre-configured policy such as VoIP bearers to be delivered over the macro eNB while the best effort traffic to be delivered over the small cell.

Figure 6:
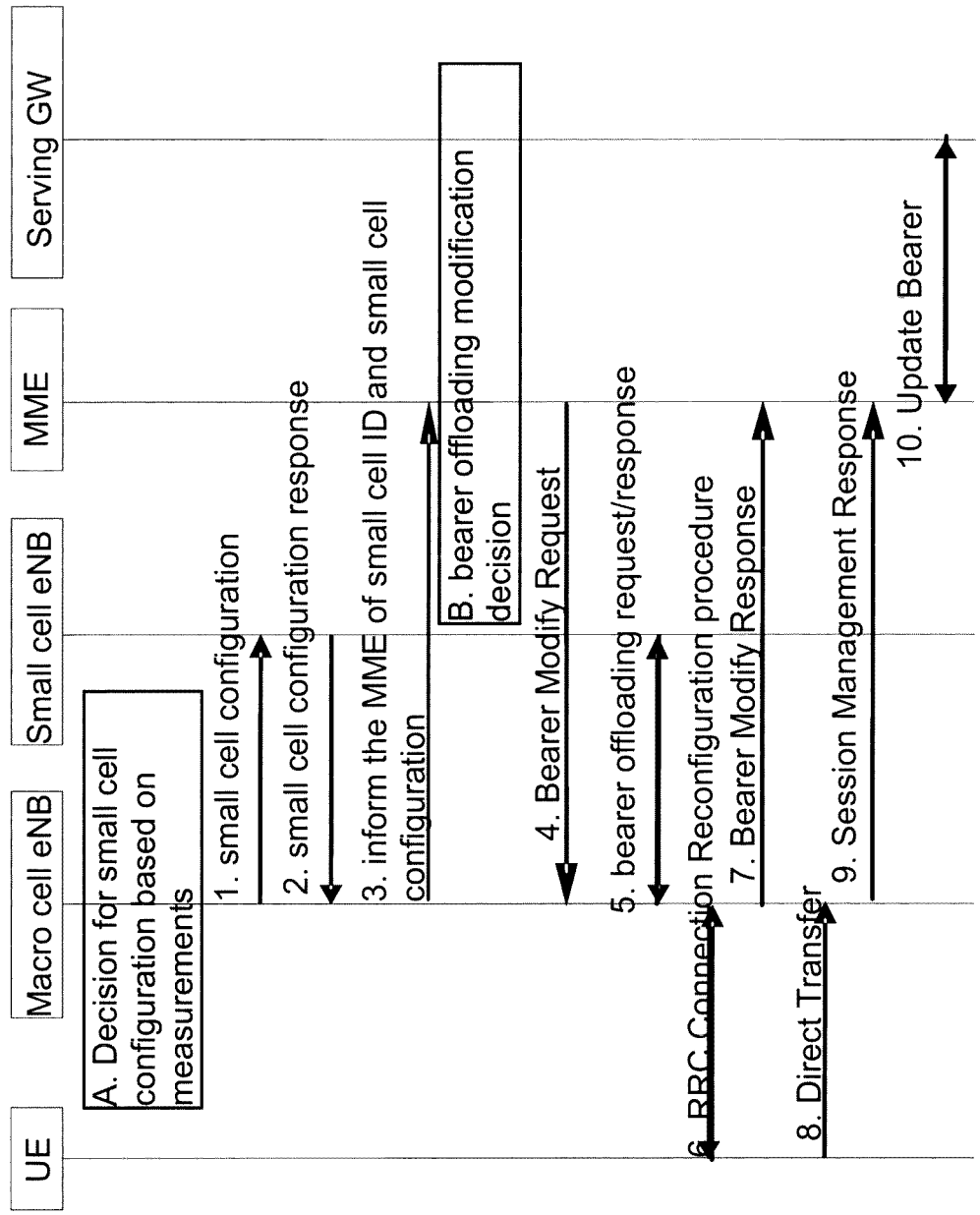
FIG. 6 is a schematic representation of a small cell configuration according to an example.

In one embodiment, the small cell configuration procedure is independent of the bearer setup procedure. A possible small cell configuration is shown in FIG. 6. The decision for small cell configuration is made by the macro eNB. The decision may be based on for example the measurement (channel quality of small cell), traffic load on the small and macro cell. The small cell is informed of the small cell configuration for the UE. Some UE context may be transferred to the small cell for preparation of UE arrival. Small cell acknowledges the small cell configuration after performing admission control. The macro eNB may also inform the UE of the small cell configuration and even the requirement for the UL synchronisation to the small cell. However the aspects of informing the UE of the small cell configuration and the UL synchronisation requirements are not covered in this invention. Note that even though the small cell is configured for the UE, there is no bearer been established from the small cell. Upon the small cell configuration complete, the MME is informed of the small cell configuration for the UE including the small cell ID by the macro eNB. The MME decides to perform traffic offloading via small cell. This may be for the new EPS bearers or the already established bearer modification such as the traffic is delivered via the small cell. The MME sends the bearer modification request to the macro eNB. The macro eNB communicates to the small cell of the traffic offloading procedure as discussed above. Upon the completion of the procedure, the UE is informed of the new radio reconfiguration parameters. Finally the MME updates the bearer modification to the serving GW for S1-U bearer setup between the small cell and the serving GW.

The present inventions can be embodied in other specific apparatus and/or methods. The described embodiments are to be considered in all respects as illustrative and not restrictive. In particular, the scope of the invention is indicated by the appended claims rather than by the description and figures herein. All changes that come within the meaning and range of equivalency of the claims are to be embraced within their scope.

The invention claimed is:

1. A method, in a radio communication system, for modification of data flows with user equipment in dual connectivity with a primary node and a secondary node of the system, comprising:
    selecting, by a mobility management entity, a serving gateway or a PDN gateway of the core network, that a data flow is to be transmitted to the user equipment in dual connectivity via the secondary node;
    upon the secondary node being selected:
        transmitting, from the mobility management entity to the primary node, a bearer modification request for the data flow;
        transmitting an offloading bearer request message from the primary node to the secondary node, and
        transmitting an offloading bearer response message from the secondary node to the primary node; and
        transmitting the data flow to the user equipment via the selected secondary node;
    wherein the primary node is a cellular telecommunications base station and the secondary node is a cellular telecommunications base station.

2. A method as claimed in claim 1, wherein the radio access network node is the primary node.

3. A method as claimed in claim 1, wherein there is no direct link between the mobility management entity and the secondary node.

4. A method as claimed in claim 3, wherein setup and/or modification data is delivered using the primary node.

5. A method as claimed in claim 1, wherein the selecting includes determining a radio condition between the user equipment and the primary node and a radio condition between the user equipment and the secondary node.

6. A method as claimed in claim 1, wherein the primary node is a macrocell base station.

7. A method as claimed in claim 1, wherein the secondary node is a small cell base station.

8. A method as claimed in claim 1, wherein the selecting that the data flow is to be transmitted to the user equipment via the secondary node is performed by the network management node located outside of the core network.

9. A method as claimed in claim 1, wherein the selecting that the data flow is to be transmitted to the user equipment via the secondary node is performed by the serving gateway.

10. A method as claimed in claim 1, wherein the selecting that the data flow is to be transmitted to the user equipment via the secondary node is performed by the PDN gateway of the core network.

11. A radio telecommunication system comprising:
    a primary node;
    a secondary node;
    a user equipment in dual connectivity with the primary node and the secondary node of the system;
    the system being operable to:
        select, by a mobility management entity, a serving gateway or a PDN gateway of the core network, that a data flow is to be transmitted to the user equipment in dual connectivity via the secondary node;
        upon the secondary node being selected:
            transmit, from the mobility management entity to the primary node, a bearer modification request for the data flow;
            transmit an offloading bearer request message from the primary node to the secondary node, and
            transmit an offloading bearer response message from the secondary node to the primary node; and
            transmit the data flow to the user equipment via the selected secondary node;
    wherein the primary node is a cellular telecommunications base station and the secondary node is a cellular telecommunications base station.

12. A system as claimed in claim 11, wherein there is no direct link between the mobility management entity and the secondary node of the system.

13. A system as claimed in claim 11, wherein the primary node is a macrocell base station and the secondary node is a small cell base station.

14. A system as claimed in claim 11, wherein the system is operable to determine a radio condition between user equipment and the primary node and a radio condition between user equipment and the secondary node.

15. A primary node of a radio telecommunication system, the radio telecommunication system further comprising:
    a secondary node; and
    a user equipment in dual connectivity with the primary node and the secondary node, wherein the system is operable to:
        select, by a mobility management entity, a serving gateway or a PDN gateway of the core network, that a data flow is to be transmitted to the user equipment in dual connectivity via the secondary node;
        upon the secondary node being selected:
            transmit, from the mobility management entity to the primary node, a bearer modification request for the data flow;
            transmit an offloading bearer request message from the primary node to the secondary node, and
            receive an offloading bearer response message from the secondary node at the primary node; and
            transmit the data flow to the user equipment via the selected node;
    wherein the primary node is a cellular telecommunications base station and the secondary node is a cellular telecommunications base station.

16. A secondary node of a radio telecommunication system, the radio telecommunication system further comprising:
    a primary node; and
    a user equipment in dual connectivity with the primary node and the secondary node, wherein the system is operable to:
        select, by a mobility management entity, a serving gateway or a PDN gateway of the core network, that a data flow is to be transmitted to the user equipment in dual connectivity via the secondary node;
        upon the secondary node being selected:
            transmit, from the mobility management entity to the primary node, a bearer modification request for the data flow;
            receive an offloading bearer request message from the primary node at the secondary node, and transmit an offloading bearer response message from the secondary node to the primary node; and transmit the data flow to the user equipment via the selected node;

wherein the primary node is a cellular telecommunications base station and the secondary node is a cellular telecommunications base station.

17. A user equipment in dual connectivity with a primary node and a secondary node of a radio telecommunication system, wherein the system is operable to:

select, by a mobility management entity, a serving gateway or a PDN gateway of the core network, that a data flow is to be transmitted to the user equipment in dual connectivity via the secondary node;

upon the secondary node being selected:

transmit, from the mobility management entity to the primary node, a bearer modification request for the data flow;

transmit an offloading bearer request message from the primary node to the secondary node and transmit an offloading bearer response message from the secondary node to the primary node; and transmit the data flow to the user equipment via the selected node;

wherein the primary node is a cellular telecommunications base station and the secondary node is a cellular telecommunications base station.

* * * * *